R. P. EKSTROM.
MILK STRAINER.
APPLICATION FILED MAY 9, 1908.

914,031.

Patented Mar. 2, 1909.

Witnesses
J. C. Simpson
C. N. Woodward

Inventor
Roy P. Ekstrom.

By
Attorneys

UNITED STATES PATENT OFFICE.

ROY P. EKSTROM, OF ELM CREEK, NEBRASKA.

MILK-STRAINER.

No. 914,031.   Specification of Letters Patent.   Patented March 2, 1909.

Application filed May 9, 1908. Serial No. 431,866.

*To all whom it may concern:*

Be it known that I, ROY P. EKSTROM, a citizen of the United States, residing at Elm Creek, in the county of Buffalo, State of Nebraska, have invented certain new and useful Improvements in Milk-Strainers; and I do hereby declare the following to be a full, clear, and exact description of the invention, such as will enable others skilled in the art to which it appertains to make and use the same.

Figure 1:
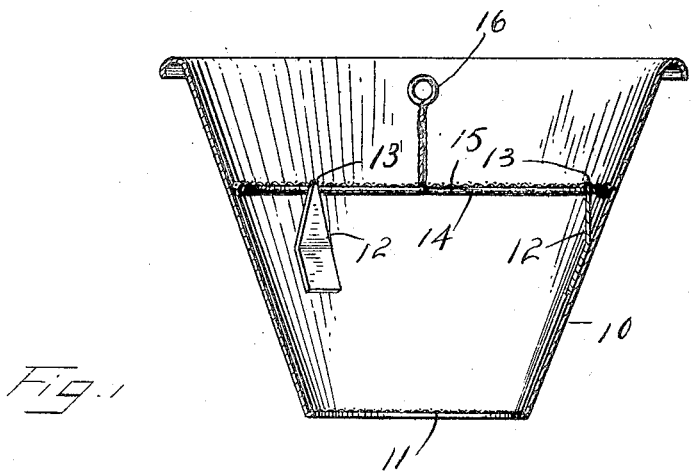
Figure 2:
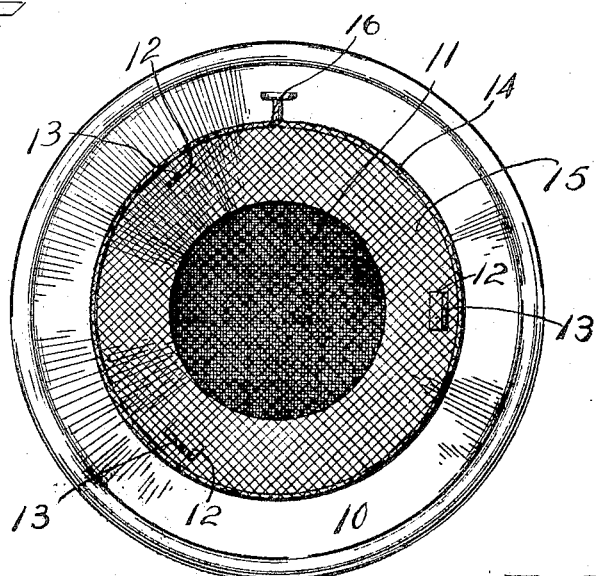

This invention relates to devices for straining milk and analogous purposes, and may be employed as a separate implement or receptacle or as an attachment to a milk pail, and has for one of its objects to provide a simply constructed device of this character having a relatively fine strainer at its lower end and a relatively coarse strainer near its upper end, the manner of suspending the coarser strainer in the receptacle being the principal feature of the present invention, and in the drawings illustrating the preferred embodiment of the invention, Figure 1 is a sectional elevation of the improved device. Fig. 2 is a plan view.

The improved device comprises a receiver 10, preferably in funnel shape and with a screen 11 at the lower end of relatively fine mesh or the mesh usually employed in milk strainers. Projecting from the inner face of the receiver 10 are a plurality of supporting devices 12 inclining inwardly and upwardly and with the free ends 13 reduced, as shown.

Resting upon the reduced ends 13 of the projections 12 is a frame 14 having a covering of relatively coarse screen material 15, the screen material engaging the reduced ends 13 of the projections and supported thereby, the reduced ends thus preventing the accidental movement of the screen. The frame 14 is provided at one side with a vertical handle 16 to enable the screen to be easily removed or adjusted within the receiver.

The upper coarser screen is designed to receive leaves, straw, and similar foreign matter and preventing it from remaining in the milk, while the small screen strains the milk in the ordinary manner.

The receiver 10 may be attached permanently to a milk pail in convenient position for the reception of the milk from the cow, or arranged as a separate receiver detachable from a pail or other receptacle.

The improved device is simple in construction, can be inexpensively manufactured, and the coarser screen being removable can be readily cleansed, and leaves the receptacle also easily cleansable.

The improved device may be of any required size or capacity, and I do not therefore wish to be limited in any manner to the precise construction shown, as various modifications may be made therein within the scope of the appended claim, without departing from the principle of the invention.

What is claimed, is:—

In combination with a strainer, having a fine screen fixedly secured at the lower end thereof, and a second screen removably fitted within said strainer and disposed adjacently the opposite end thereof, a support for the said second named screen consisting of a plurality of brackets, each of said brackets being formed of a single piece of sheet metal substantially triangular in contour, the base end of which is secured to the inner face of the strainer and the horizontal central portion of which is flexed inwardly with respect to the strainers, so that the vertex will enter the openings of the second named screen.

In testimony whereof, I affix my signature, in presence of two witnesses.

ROY P. EKSTROM.

Witnesses:
 EARLE BLISS,
 C. C. BLISS.